United States Patent [19]

Newell

[11] 4,298,084
[45] Nov. 3, 1981

[54] GUIDANCE SYSTEM FOR TRACKLAYING TRACTORS

[76] Inventor: Marvin H. Newell, 2056 Edgewood Dr., Lodi, Calif. 95240

[21] Appl. No.: 139,018

[22] Filed: Apr. 10, 1980

[51] Int. Cl.³ .......................... B62D 1/26; B62D 15/02
[52] U.S. Cl. .................................. 180/131; 104/244.1; 172/26
[58] Field of Search ................... 180/131, 79; 280/776; 104/244.1; 172/5, 26

[56] References Cited

U.S. PATENT DOCUMENTS

| | | | |
|---|---|---|---|
| 2,465,660 | 3/1949 | Phillips | 104/244.1 |
| 2,827,704 | 3/1958 | Hunsicker | 33/264 |
| 2,993,548 | 7/1961 | Kiel | 181/131 |
| 3,028,678 | 4/1962 | Bakehouse | 33/264 |
| 3,123,148 | 3/1964 | Sieling | 172/26 |
| 3,181,441 | 5/1965 | Flom | 404/84 |
| 3,258,082 | 6/1966 | Amos et al. | 180/131 |
| 3,326,319 | 6/1967 | Schmidt | 180/131 |
| 3,548,966 | 12/1970 | Blacket | 180/131 |
| 3,611,286 | 10/1971 | Cleveland | 280/776 |
| 3,679,019 | 7/1972 | Hobday et al. | 180/131 |
| 3,724,584 | 4/1973 | Varichon | 180/79 |
| 3,765,501 | 10/1973 | Burvee | 180/131 |
| 3,905,715 | 9/1975 | Dale | 404/84 |
| 4,131,176 | 12/1978 | Ruoff | 180/131 |
| 4,180,133 | 12/1979 | Collogan et al. | 172/26 |
| 4,219,093 | 8/1980 | Lang | 180/131 |

OTHER PUBLICATIONS

"TAG" Catalog page published by Electronic Systems Division of Geosource, Inc. of Modesto, Ca.

*Primary Examiner*—Joseph F. Peters, Jr.
*Assistant Examiner*—Donn McGiehan
*Attorney, Agent, or Firm*—James R. Cypher

[57] ABSTRACT

A guidance system for a track laying tractor in which a furrow following device attached to the track frame senses the distance from the furrow to the tractor and signals the operator or the hydraulic steering system and consists briefly of a sight wheel mounted orthogonally to the rear sprocket, cone wheels mounted for transverse movement orthogonally to the front idler, a bar rigidly attached to the cone wheels and universally to the rear sight wheel mounting and transmittal means for transmitting the distance of the furrow to the tractor and receiver means for indicating the distance to the tractor operator.

10 Claims, 8 Drawing Figures

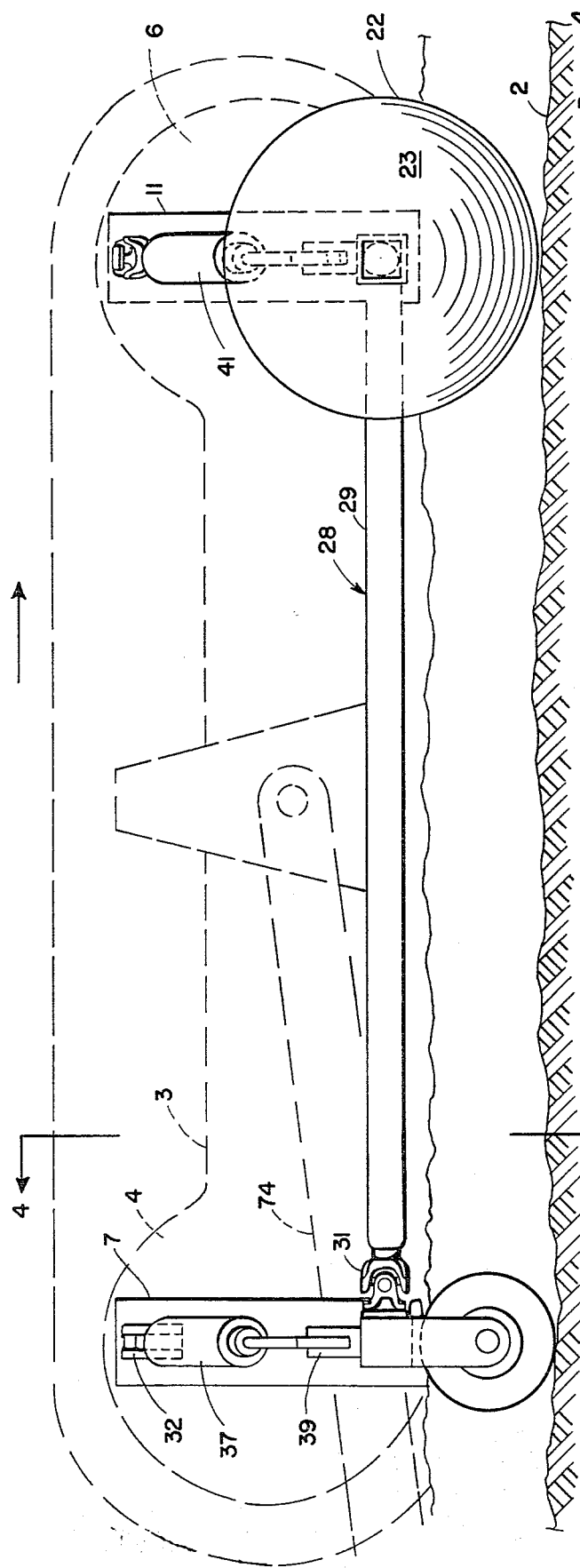
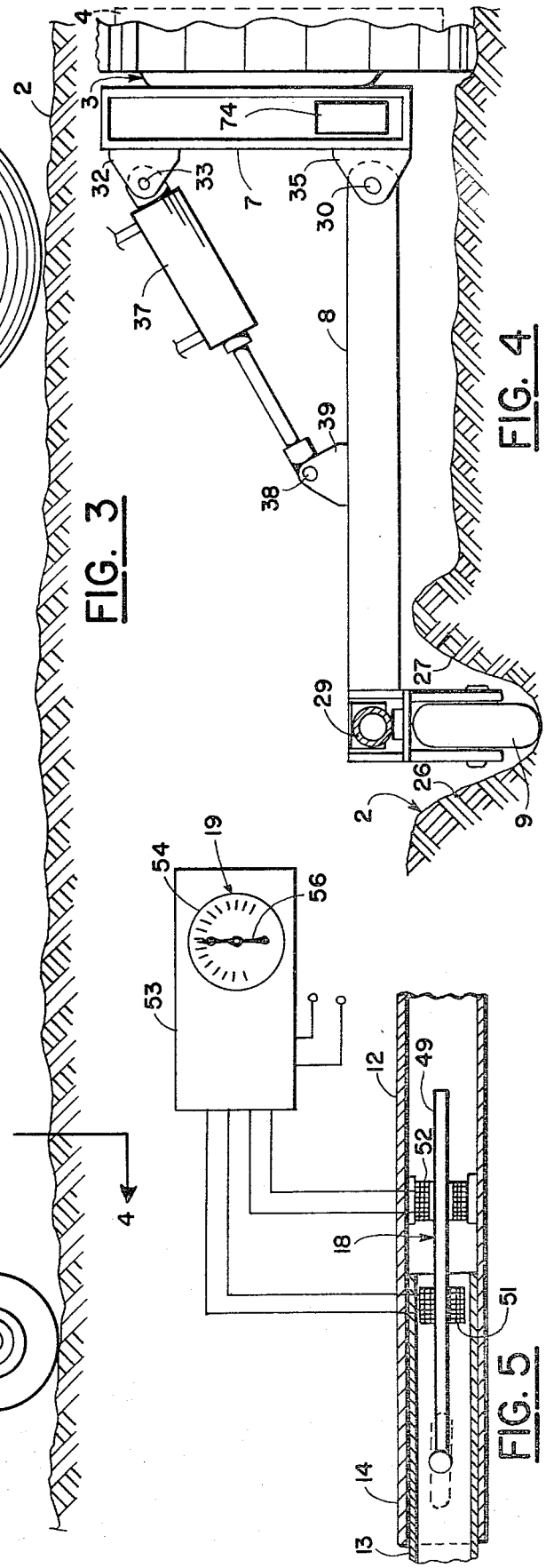
FIG. 3
FIG. 4
FIG. 5

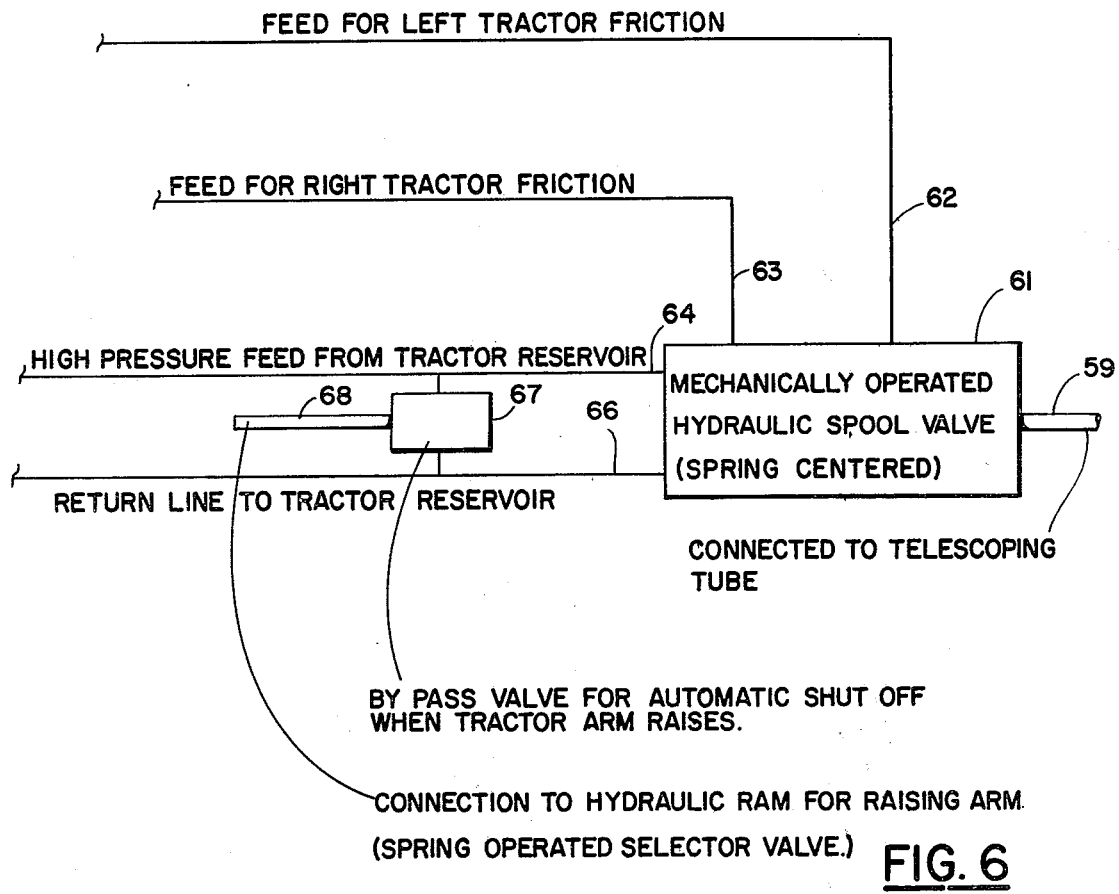
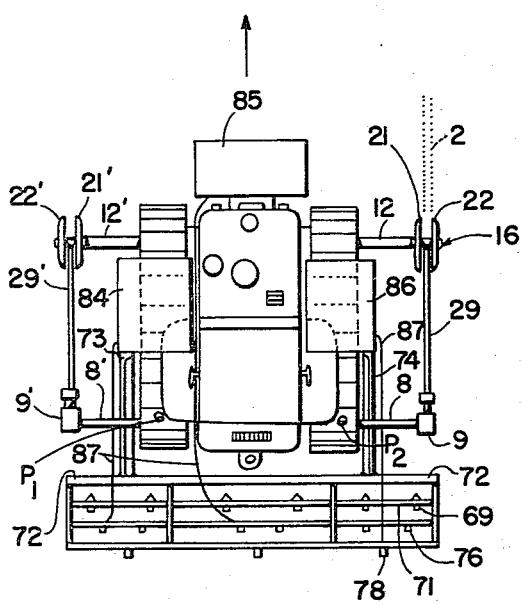
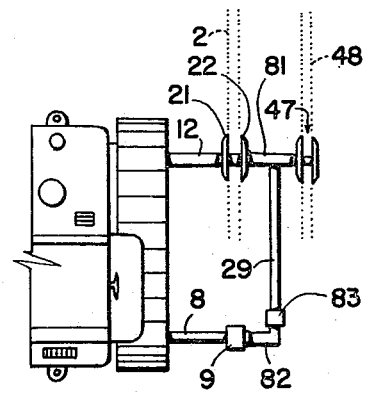

GUIDANCE SYSTEM FOR TRACKLAYING TRACTORS

BACKGROUND OF THE INVENTION

On large farms many crops are cultivated and harvested by machines which process several rows at a time. These machines are designed to operate on the assumption that all of the rows are substantially evenly spaced. The machines which make the furrows prior to planting, make a plurality of nearly perfectly evenly spaced rows for each pass across the field. In practice, however, it is impossible to maintain the exact row spacing between successive passes of the machine across the field. The first row next to the last row of the previous pass of the machine thus has become known as the "guess" row because it has been impossible for even the most skilled tractor operator to maintain the exact spacing. Thus, when the operator does not keep the spacing exactly the same between the adjacent rows of successive passes of the furrowing and planting machines, the harvesting machine will either miss an entire row or depending upon the crop and the harvesting mechanism, it will either destroy or improperly harvest at least one and sometimes more rows of the particular crop. Since many harvesting machines are automatically steered by mechanisms which have sensors which contact the crop, as for example, Schmidt, U.S. Pat. No. 3,326,319, an inattentive operator can and often does destroy a great quantity of crops because the machine does not take into consideration the uneven row spacing in the "guess row".

The problem of spacing crop rows is discussed in Hunsicker, U.S. Pat. No. 2,827,704 granted Mar. 25, 1958 and the patent teaches a visual sighting mechanism attached to the tractor.

Bakehouse, U.S. Pat. No. 3,028,678 granted Apr. 10, 1962 also is concerned with spacing and uses a cross bar attached to the tractor with chains reaching to the ground to assist the operator in visually sighting the previous row.

The first automatic furrow following device for a wheeled tractor found by Applicant in the prior art is Blachet, U.S. Pat. No. 3,548,966 granted Dec. 22, 1970. Blachet discloses a single wheel device mounted on the front end of a wheeled tractor.

There are many sophisticated devices in the prior art for following a guide wire such as Amos, U.S. Pat. No. 3,258,082 granted June 28, 1966, see also Ruoff, U.S. Pat. No. 4,131,176 granted Dec. 26, 1978 in which a sensor moves the wheel of the vehicle in relation to a fixed guide rail.

A very sophisticated guidance system is shown in Hobday, U.S. Pat. No. 3,679,019 granted July 25, 1972 in which a wheeled vehicle follows a buried wire.

All of the previously cited references relate to wheeled tractors and vehicles. Crawler type vehicles are also automatically steered but all of those found by Applicant follow a guide-wire. The earliest track laying, guide-wire following machine found by Applicant is Flom, U.S. Pat. No. 3,181,441 granted May 4, 1965. The latest track laying guide-wire following apparatus found by Applicant is Dale, U.S. Pat. No. 3,905,715 granted Sept. 16, 1975.

A furrow following wheeled plow is shown in Sieling, U.S. Pat. No. 3,123,148 granted Mar. 3, 1964. This device is designed to straighten out successive furrows even though the straightening process would change the spacing between adjacent furrows. The Sieling plow cuts only a single furrow with each pass across a field.

A furrow following device is shown in Burvee, U.S. Pat. No. 3,765,501 granted Oct. 16, 1973. Burvee discloses a device for a wheeled tractor and connects the furrow following device to the mid-point of the frame of the tractor. The furrow following device has only a single point of contact with the furrow; mainly a cone wheel spaced from the front wheel of the tractor.

A commercial furrow following device for wheeled tractors is made by electronics system division of Geosourse, Inc. of Modesto, Calif. and is sold under the trademark TAG. In this system, the furrow following device is mounted directly to the front portion of the frame of the wheeled tractor.

The prior art system for making furrows with crawler tractors is as follows: For the initial pass, a transit is set up and stakes or bags are placed along the line for the tractor operator to follow. A device for making a "guide furrow" is attached to the rear cross bar and this becomes the guide for the operator on the second pass. When the operator has completed the first pass and has turned his crawler tractor to make the second pass, the tractor operator aligns a marking device on the front of the tractor such as the radiator cap with the previously made marking furrow and then sights along these two marks down the entire length of the field to a distant arbitrary mark such as a tree. The operator then steers the tractor toward the distant point and attempts to keep his eye on the distant point and the radiator cap or other marker on the tractor during the entire furrowing pass. A problem with this procedure is the operator can not keep his eye on the machinery to see whether or not the fertilizer, fungicide and other chemicals are being injected into the soil. Primarily, however, driver fatigue, dust, and glaring sun make it very difficult for drivers, using the present system to maintain the critical row spacing hour after hour.

None of the prior art systems for causing a wheeled tractor to move parallel to a previously formed furrow are adaptable for track laying tractors. The reason for this is the fact that a wheeled vehicle with steerable front wheels moves in an arc when the front wheels are steered to the right or left. In contrast, a track laying vehicle pivots when it is steered. To add to this complication, the tractor does not pivot about a single point but in fact pivots about two different points. If the tractor is steered to the right, the pivot point lies beneath a center point on the right track laying mechanism. If the tractor is steered to the left, the pivot point lies beneath the left track laying mechanism. Further, the pivot point is not always at the same point beneath the track laying mechanism. L. L. Karafiath in his book SOIL MECHANICS FOR OFF-ROAD VEHICLE ENGINEERING, TRANS TECH PUBLICATIONS, T.L., 235, point 6, k, 34, E.N.G.I. (1978) at Page 443 and FIG. 399, demonstrated that the stresses under the track are trapezoidal at zero draw bar pull. As the draw bar pull gradually changes, the distribution of stress changes to an approximate triangle with the acute angle at the rear driving sprocket. Thus, it may be concluded, that the pivot point under full draw bar load is approximately at the center of the tread at the rear sprocket. These pivot points are shown in FIG. 7 of the drawings as $P_1$ under the left track and $P_2$ under the right track.

SUMMARY OF THE INVENTION

The present invention is a device which will closely follow a furrow made in a previous pass of the machine as distinguished from a special "guide furrow" and actuates the steering mechanism of a track laying tractor so that row spacing between successive passes of the machine will deviate less than 1 inch.

Accuracy in row spacing is maintained row after row without guide wires or buried signal wires. The furrow following device and the furrow making machinery are attached to the upsprung track roller frame rather than the main frame of the tractor which is carried by springs and constantly moves up and down and in a rolling motion as the tractor traverses the uneven ground.

Accuracy of the device is achieved by a two point contact between the furrow and the tractor. A sight wheel is spaced from the rear of the tractor and cone wheels are spaced an identical distance from the front of the tractor. Maintaining touching contact with the furrow by the front cone wheels and the rear sight wheels maintains the tractor in accurate parallel alignment with the furrow. Prior art devices such as Burvee, supra which have only a single point of contact with the furrow can not keep the accurate spacing because the furrow following device can be indicating the correct spacing distance while the tractor remains out of alignment with the furrow.

BRIEF DESCRIPTION OF THE DRAWINGS

FIG. 2 is on a slightly enlarged scale as compared to FIG. 1.

FIG. 3 is a side elevational view of the guidance system of the present invention.

FIG. 4 is an elevational view taken generally along line 4-4 of FIG. 3.

FIG. 5 is a schematic of the portion of the guidance system shown in FIG. 2.

FIG. 6 is a schematic of the guidance system and hydraulic steering system of the tractor.

FIG. 7 is a top elevational view of the guidance system of the present invention.

FIG. 8 is a top view of a portion of an alternate form of the invention.

DESCRIPTION OF THE PREFERRED EMBODIMENTS OF THE INVENTION

Figures 1, 2:
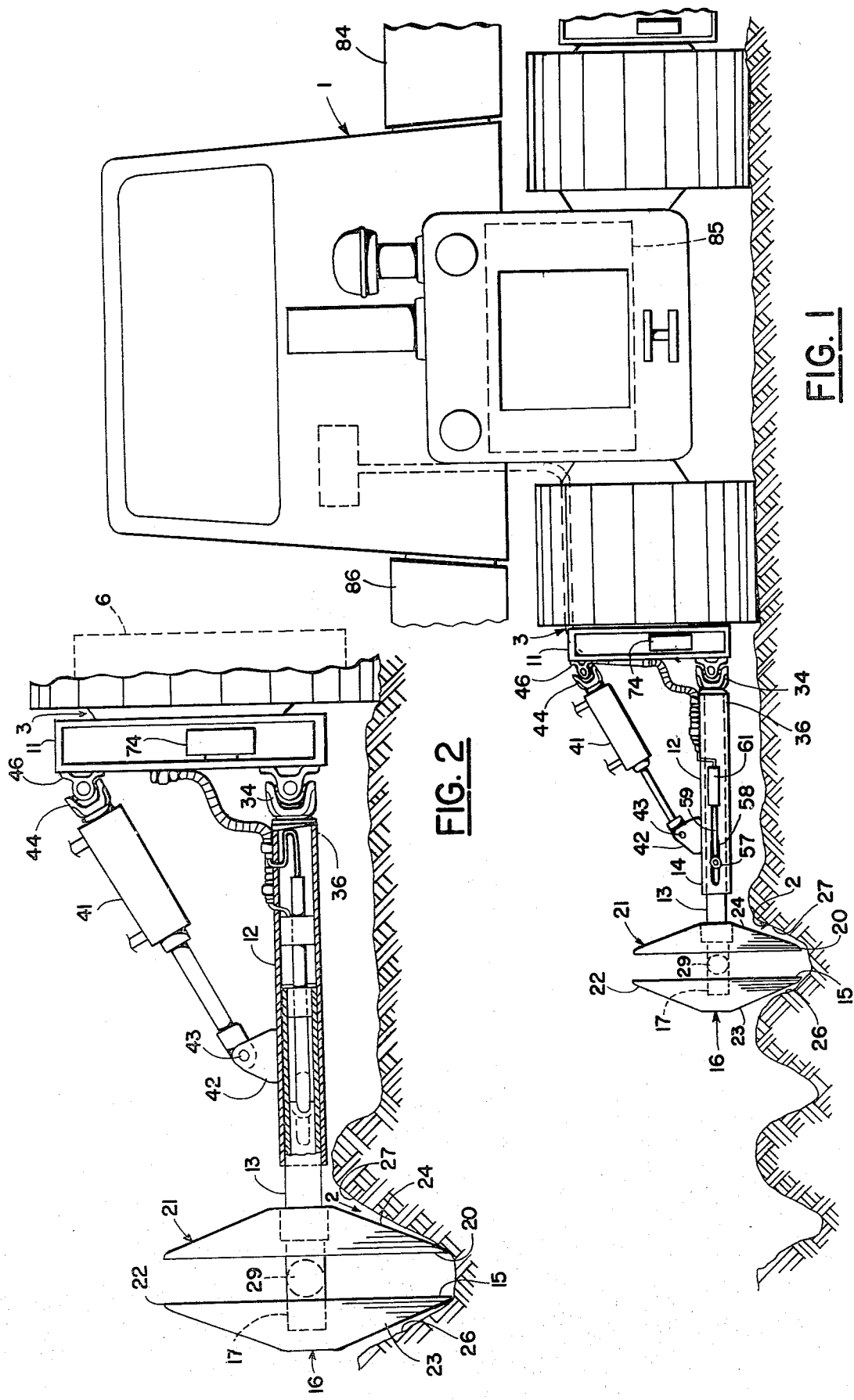
FIG. 1 is a front elevational view of the guidance system of the present invention.
FIG. 2 is a front elevational view of a portion of an alternate form of the guidance system with portions in cross section to more clearly illustrate the invention.

The guidance system is for a track laying tractor 1 for maintaining the tractor at a pre-selected distance from a previously constructed ground furrow 2. The tractor includes a tractor roller frame 3, a rear sprocket 4 and a front idler 6. The guidance system includes a rear mount frame 7 attached to the rear outside portion of the track roller frame 3. A rear arm 8 is connected to the rear mount frame 7 and extends outwardly at substantially a right angle from the rear sprocket 4. A sight wheel 9 is mounted on the rear arm 8 and is adapted for riding in the previously formed furrow 2 at a selected fixed distance from the rear mount frame 7. The sight wheel of the furrow following device is located substantially on a line which orthogonally intersects the longitudinal axis of the tractor and the steering pivot points $P_1$ and $P_2$ of the tractor. A front mount frame 11 is attached to the front outside portion of the track roller frame. A front arm 12 is connected to the front mount frame 11 and extends outwardly from the tractor at substantially a right angle to the front idler. An extension arm 13 is slidably mounted coaxially on the distal end 14 of the front arm 12.

Furrow following means 16 are mounted on the distal end 17 of the extension arm 13 and are adapted for staying within the previously formed furrow at the selected fixed distance. Transmittal means 18 mounted on the front arm are connected for measuring and transmitting the difference in distance of the furrow following means from the front mount frame as compared to the selected fixed distance of the rear sight wheel 9 from the rear mount frame 7. A receiver means 19 is operatively connected to the transmittal means for indicating the relative distance of the furrow following means from the front mount frame 11 and the selected fixed distance of the sight wheel from the rear mount frame.

The furrow following means includes a pair of cone wheels 21 and 22. The cone wheels are a standard item and each has an edge 15 and 20 for riding in the bottom of the furrow and tapered sides 23 and 24 for riding against the sloped edges 26 and 27 of the furrow 2.

The guidance system includes pushing means 28 connected to the cone wheels for maintaining the alignment of the cone wheels in a direction in alignment with the direction of the previously formed furrow. The pushing means consists of a push bar member 29 fixedly attached to the extension arm 13 at its front end and attached to the rear arm 8 by a universal joint 31. The cone wheels are in effect pushed by the bar. The bar stablizes the cone wheels in much the same manner as a long handled shovel would slide within a furrow if pushed from the end of the handle. A short push bar or a short handled shovel (if we were to carry through the simile), would be relatively directionally unstable.

The extension arm 13 and the front arm 12 are coaxially and telescopically attached to one another as shown in FIGS. 1 and 2. Relative movment is about 8 inches. As shown in FIG. 4, the rear arm 8 is pivotally connected to the rear mount frame 7 by pin 30 and bracket 35 for movement in a vertical plane.

The front arm 12 is universally connected to the front mount frame for movement in vertical and horizontal planes. The universal joint 34 is connected to end 36 of the front arm and to the front frame 11.

Preferably there is a means provided for raising and lowering the front and rear arms. A hydraulic ram 37 may be connected to pin 38 and bracket 39 to the rear arm and by pin 33 and bracket 32 to the rear mount frame. The front arm 12 is raised and lowered by a hydraulic ram 41 connected to the front arm by a bracket 42 and pin 43. The upper end of the hydraulic ram is connected to the front frame by a universal joint 44 and a bracket 46.

Where a field is rough or filled with clods of dirt, a second set of cone wheels gives more accurate results. An alternate form of the invention is shown in FIG. 8 in which the furrow following means includes a second pair of cone wheels 47 mounted on a second extension member 81 for following an adjacent furrow 48. Push bar 29" is rigidly connected to second extension 81 and universally connected to rear arm extension 82 at universal joint 83. All other parts of the furrow following means are identical and carry identical numbers as the previous form of the invention.

In the form of the invention shown in FIG. 5, the transmittal means 18 for measuring and transmitting the difference in distance of the furrow following means from the front mount frame as compared to the selected fixed distance of the rear sight wheel from the rear mount frame consists of a slug 49 and coil 51 fixed to the extension arm 13 and a coil 52 fixed to the front arm 12. A signal generated by the amplifier 53 feeds the field of coil 51. As the extension arm 13 and front arm 12 moved together, the field in coil 52 increases thereby increasing the voltage reading on the meter 54. The voltage reading decreases as the extension arm and front arm move away from one another. By setting the voltage so that the needle 56 is centered when the tractor is parallel to the previous furrow, when the tractor moves to the right, the needle will move to the right, and the meter will indicate left as the tractor moves in that direction.

In the preferred form of the invention, the cone wheels 21 and 22 mounted on the extension arm 13 operate a hydraulic steering means on the tractor which automatically steers the tractor. As shown in FIGS. 1 and 6, extension arm 13 is telescopically mounted on front arm 12. Pin 57 mounted on the extension arm is inserted through slot 58 in the front arm. A rod 59 is connected to the pin and a hydraulic spool valve 61. The spool valve may be any off-the-shelf item such as CVA and DCVA series control valve manufactured by Energy Manufacturing Co., Inc. As the spool valve rod moves in and out, the spool valve makes the proper connections between the feed line 62 to the left tractor friction or the feed line 63 to the right tractor friction. A high pressure feed line 64 from the tractor reservoir is connected to the spool valve and a return line 66 is connected to the tractor reservoir and the spool valve. A bypass valve 67 for automatic shut-off is provided when the entire furrow following assembly is raised. A line 68 is connected to the hydraulic ram for raising the arm. The spool valve carries a spring for centering the device so that neither the right or left feed line to the tractor frictions is activated. In this mode, the tractor moves in a straight line parallel to the furrow.

In operation, the first series of furrows are made by the tractor following a line previously established by a transit and marked by stakes or bags. This first pass is made with the furrow following assembly in the raised position. Several furrows are made by shovels 69 mounted on the auxiliary cross-bar 71 which is mounted behind cross bar 72 attached to the right and left track roller frames by draw bars 73 and 74. Fertilizer injector 76 is attached to auxiliary cross bars 77. Other chemicals such as fumigants may be injected through nozzles 78 on auxiliary cross bar 79.

An identical furrow following device is mounted on the left side of the tractor as well as the right side. The mechanism is identified by numbers followed by a prime mark (').

When the operator has completed the first pass and turned his tractor, he lines up the tractor with the last furrow 2 made on the first pass so that the sight wheel 9 rides in the bottom of the furrow. The front of the tractor is then pivoted so that the cone wheels 21 and 22 ride in the forward part of the same furrow as the sight wheel. The operator then pivots the front of the tractor so that the needle 56 of meter 54 indicates that the tractor is now parallel to the furrow.

If the tractor has the automatic steering device, the cone wheels are positioned in the furrow and the tractor automatically positions itself parallel to the furrow. The tractor will automatically steer itself down the field and the furrows made in the second pass will be automatically and accurately spaced from the furrows made in the first pass.

In the alternate form of the invention shown in FIG. 5, the operator must steer the tractor so that the indicator needle 56 is always in the indexed position which indicates that the tractor is moving parallel to the furrow and at the pre-selected set distance from the furrow.

With either of the forms of the invention, the tractor moves parallel to the previously made furrow with a maximum deviation of about one inch.

When the automatic steering form of the invention is used, the operator does not have to steer the tractor and can thus watch the making of the furrows and be sure that the fumigants and fertilizers are being properly injected while the furrows are being made. The automatic steering of the tractor also relieves the driver of the extreme tension and tedium of attempting to drive a crawler tractor over a plowed field with extreme alignment accuracy and often under adverse conditions such as dust, fog, or driving the tractor into the sun in the early morning hours or late evening hours.

With the use of the automatic steering device, the spacing between furrows of adjacent passes can now be accurately made and harvesting machines which are set to harvest several evenly spaced rows of crops do not destroy crops because of uneven spacing of the rows.

I claim:

1. A guidance system for a track laying tractor for maintaining said tractor at a pre-selected distance from a previously formed ground furrow said tractor having a track roller frame, a rear sprocket, and front idler comprising:
   (a) a rear mount frame attached to the rear outside portion of said track roller frame;
   (b) a rear arm connected to said rear mount frame extending outwardly at substantially a right angle from said rear sprocket;
   (c) a sight wheel mounted on said rear arm adapted for riding in said previously formed furrow at a selected fixed distance from said rear mount frame;
   (d) a front frame attached to the front outside portion of said track roller frame;
   (e) a front arm connected to said front mount frame extending outwardly from said tractor at substantially a right angle to said front idler;
   (f) an extension arm slidably mounted coaxially on the distal end of said front arm;
   (g) furrow following means mounted on the distal end of said extension arm adapted for staying within said previously formed furrow at said selected fixed distance;
   (h) transmittal means mounted on said front arm for measuring, and transmitting the difference in distance of said furrow following means from said front mount frame as compared to said selected fixed distance of said rear sight wheel from said rear mount frame; and
   (i) receiver means operatively connected to said transmittal means for indicating the relative distance of said furrow following means from said front mount frame, and said selected fixed distance of said sight wheel from said rear mount frame.

2. A guidance system as described in claim 1 wherein:
   a. said furrow following means includes a pair of cone wheels.

3. A guidance system as described in claim 2 comprising:
 a. pushing means connected to said cone wheels for maintaining the alignment of said wheels in a direction in alignment with the direction of said previously formed furrow.

4. A guidance system as described in claim 3 wherein:
 a. said pushing means includes an elongated push bar attached to said rear arm;
 b. said push bar is rigidly affixed to said cone wheels in longitudinal alignment with the direction of said cone wheels.

5. A guidance system as described in claim 4 wherein:
 a. said push bar is universally pivotally attached to said rear arm.

6. A guidance system as described in claim 5 wherein:
 a. said extension arm and said front arm are coaxially and telescopically attached to one another.

7. A guidance system as described in claim 6 wherein:
 a. said rear arm is pivotally connected to said rear mount frame for movement in a vertical plane; and
 b. said front arm is universally connected to said front mount frame for movement in vertical and horizontal planes.

8. A guidance system as described in claim 7 comprising:
 a. means connected to said rear and front mount frames and to said rear and front arms for selectively lowering and raising said rear and front arms and said sight wheel and said cone wheels into and out of said furrow.

9. A guidance system as described in claim 2 comprising:
 a. said furrow following means includes a second pair of cone wheels mounted for following an adjacent furrow.

10. A guidance system for a track laying tractor for maintaining said tractor at a pre-selected distance from a previously formed ground furrow said tractor having a track roller frame, a rear sprocket, and front idler comprising:
 (a) a rear mount frame attached to the rear outside portion of said track roller frame;
 (b) a rear arm connected to said rear mount frame extending outwardly at substantially a right angle from said rear sprocket;
 (c) a sight wheel mounted on said rear arm adapted for riding in said previously formed furrow at a selected fixed distance from said rear mount frame;
 (d) a front mount frame attached to the front outside portion of said track roller frame;
 (e) a front arm connected to said front mount frame extending outwardly from said tractor at substantially a right angle to said front idler;
 (f) an extension arm slidably mounted coaxially on the distal end of said front arm;
 (g) furrow following means mounted on the distal end of said extension arm adapted for staying within said previously formed furrow at said selected fixed distance;
 (h) transmittal means for measuring, and transmitting the difference in distance of said furrow following means from said front mount frame as compared to said selected fixed distance of said rear sight wheel from said rear mount frame; and
 (i) hydraulic steering means operatively connected to said transmittal means for steering said tractor in response to the relative position of said furrow following means and said tractor.

* * * * *